(12) United States Patent
Yasui

(10) Patent No.: US 12,211,318 B2
(45) Date of Patent: Jan. 28, 2025

(54) PROCESSING APPARATUS, MOBILE OBJECT, PROCESSING METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 17/686,448

(22) Filed: Mar. 4, 2022

(65) Prior Publication Data

US 2022/0284736 A1    Sep. 8, 2022

(30) Foreign Application Priority Data

Mar. 8, 2021    (JP) .................................. 2021-036624

(51) Int. Cl.
| | | |
|---|---|---|
| G06V 40/00 | (2022.01) | |
| G06T 5/50 | (2006.01) | |
| G06V 10/34 | (2022.01) | |
| G06V 40/16 | (2022.01) | |
| G06V 40/20 | (2022.01) | |

(52) U.S. Cl.
CPC .............. *G06V 40/20* (2022.01); *G06T 5/50* (2013.01); *G06V 10/34* (2022.01); *G06V 40/172* (2022.01)

(58) Field of Classification Search
CPC ...... G06V 40/20; G06V 10/34; G06V 40/172; G06V 10/56; G06V 10/74; G06V 20/52; G06V 40/103; G06V 40/161; G06V 10/25; G06T 5/50; G05D 1/0253; H04N 7/0117

See application file for complete search history.

(56) References Cited

U.S. PATENT DOCUMENTS

| | | | |
|---|---|---|---|
| 10,839,203 B1 * | 11/2020 | Guigues | ................... G06T 7/292 |
| 11,232,294 B1 * | 1/2022 | Banerjee | .................. G06T 7/246 |
| 11,568,624 B1 * | 1/2023 | Ramanathan | ........ H04N 5/2628 |
| 2008/0298643 A1 | 12/2008 | Lawther et al. | |
| 2010/0033579 A1 | 2/2010 | Yokohata et al. | |
| 2014/0002604 A1 | 1/2014 | Ohba et al. | |
| 2021/0350570 A1 | 11/2021 | Hibi et al. | |

FOREIGN PATENT DOCUMENTS

| | | |
|---|---|---|
| CN | 101605209 | 12/2009 |
| CN | 103460242 | 12/2013 |
| CN | 109376730 | 2/2019 |

(Continued)

OTHER PUBLICATIONS

Chinese Office Action for Chinese Patent Application No. 202210184131.4 mailed Dec. 26, 2023.

(Continued)

*Primary Examiner* — Ping Y Hsieh
(74) *Attorney, Agent, or Firm* — Amin, Turocy & Watson, LLP

(57) ABSTRACT

A processing apparatus converts a first image into a second image with a lower resolution than a resolution of the first image, specifies a target region including a predetermined objective target in the second image on the basis of the second image, and specifies a target region including the objective target in the first image on the basis of the specified target region in the second image.

13 Claims, 16 Drawing Sheets

(56) References Cited

FOREIGN PATENT DOCUMENTS

| CN | 110390295 | | 10/2019 | | |
|---|---|---|---|---|---|
| CN | 111344644 | | 6/2020 | | |
| CN | 111062312 B | * | 10/2023 | ............. | G06F 3/017 |
| JP | 2001-092976 | | 4/2001 | | |
| JP | 2017-052490 | | 3/2017 | | |
| JP | 2018-088234 | | 6/2018 | | |
| JP | 2020-071720 | | 5/2020 | | |
| WO | 2018/150569 | | 8/2018 | | |
| WO | 2020/100664 | | 5/2020 | | |

OTHER PUBLICATIONS

Chinese Office Action for Chinese Patent Application No. 202210184131.4 mailed Jun. 14, 2024.

Japanese Office Action for Japanese Patent Application No. 2021-036624 mailed Sep. 3, 2024.

Kobayashi et al., "The Study on the multi smart sensors system and the application", Information processing society research report, Japan, Incorporated, Information Processing Society, Oct. 24, 2003, vol. 2003, No. 105, pp. 19 to 24.

Koide et al., "Construction of the active human recognition system using autonomous robot", The Research Institute, Japan, Electric Society, Dec. 1, 2000, pp. 15 to 20.

Nishimura et al., "Spotting recognition of Gestures Performed by Moving Person from Time-Varying Image", The technical research report of the Institute of Electronics, Information and Communication Engineers, Jan. 12, 1998, vol. 97, No. 595, pp. 89 to 96.

Van Den Bergh et al., "Real-time 3D hand gesture interaction with a robot for understanding directions from humans", IEEE, 2011, and 2011 RO-MAN [online] pp. 357-362, [date of search Aug. 27, 2024], Internet:<URL:https://ieeexplore.ieee.org/stamp/stamp.jsp?tp=&arnumber=6005195>, DOI: 10.1109/ROMAN.2011.6005195.

* cited by examiner

FIG. 5
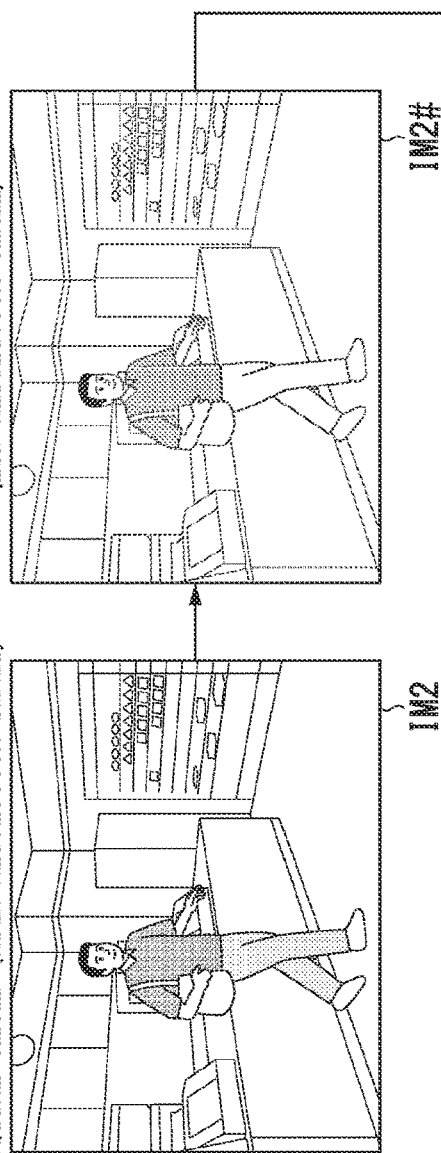
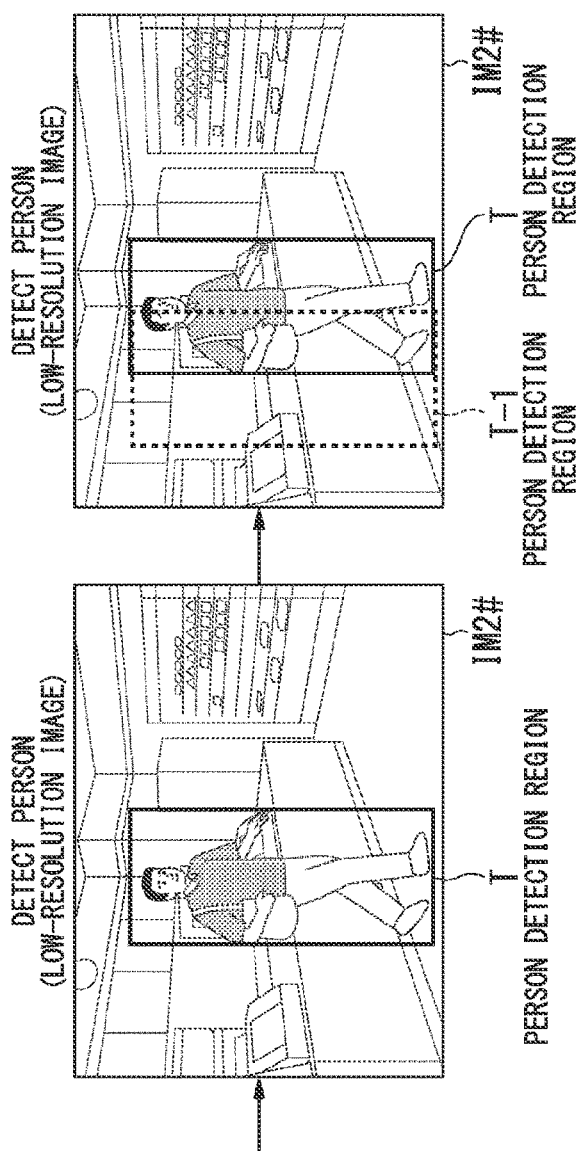

PROCESSING APPARATUS, MOBILE OBJECT, PROCESSING METHOD, AND STORAGE MEDIUM

CROSS-REFERENCE TO RELATED APPLICATION

Priority is claimed on Japanese Patent Application No. 2021-036624, filed Mar. 8, 2021, the content of which is incorporated herein by reference.

BACKGROUND

Field

The present invention relates to a processing apparatus, a mobile object, a processing method, and a storage medium.

Description of Related Art

In the related art, an information processing apparatus that analyzes images captured by two cameras and tracks an object is disclosed (Japanese Patent Unexamined Application, First Publication No. 2018-88234).

SUMMARY

However, the aforementioned technology may require a complicated configuration of an apparatus used or a high processing load.

The present invention was made in consideration of such circumstances, and an object thereof is to provide a processing apparatus, a mobile object, a processing method, and a storage medium capable of accurately specifying a target while reducing a processing load.

The processing apparatus, the mobile object, the processing method, and the storage medium according to the invention employ the following configurations.

(1): A processing apparatus according to an embodiment of the invention includes: a storage device configured to store instructions; and one or more processors, and the one or more processors execute the instructions stored in the storage device to convert a first image into a second image with a lower resolution than a resolution of the first image, and specify a target region including a predetermined objective target in the second image on the basis of the second image and specify a target region including the objective target in the first image on the basis of the specified target region in the second image.

(2): In the aforementioned aspect (1), the one or more processors execute the instructions to analyze the second image obtained by converting the first image captured at a first clock time and the second image obtained by converting the first image captured at a second clock time later than the first clock time and track, in the second image corresponding to the second clock time, an objective target included in the target region in the second image corresponding to the first clock time.

(3): In the aforementioned aspect (1) or (2), the one or more processors execute the instructions to track the objective target in the second image on the basis of a change in position of the objective target in second images in a time series manner obtained by converting first images captured in a time series manner.

(4): In any of the aforementioned aspects (1) to (3), the objective target is a person, and the one or more processors execute the instructions to track the person in the second image on the basis of one or more pieces of information out of a color of clothes of the person, the gender of the person, and a hairstyle of the person obtained from the second image, which is obtained by converting the first image captured in the past, or stored in a storage.

(5): In any of the aforementioned aspects (1) to (4), the one or more processors execute the instructions to specify a target region including the objective target in the first image before conversion into the second image on the basis of the target region in the second image and execute predetermined image recognition processing on the specified target region in the first image.

(6): In the aforementioned aspect (5), the predetermined image recognition processing includes processing for recognizing a gesture of the objective target on the basis of information regarding a specific region in the target region in the first image.

(7): In the aforementioned aspect (6), the predetermined image recognition processing includes specifying the specific region on the basis of recognition of a skeleton or joint points in the target region in the first image.

(8): In the aforementioned aspect (7), the predetermined image recognition processing includes processing of regarding a region including arms or hands of the objective target as the specific region on the basis of a result of recognizing the skeleton or the joint points.

(9): In any of the aforementioned aspects (6) to (8), the predetermined image recognition processing includes processing of recognizing a gesture using, with priority, information regarding a specific region with a high degree of chronological change in motions of the objective target in two or more specific regions in the target region in the first image.

(10): In the aforementioned aspect (9), the two or more specific regions include at least a specific region specified as a region including a right arm or a right hand of the objective target and a specific region specified as a region including a left arm or a left hand of the objective target.

(11): In any of the aforementioned aspects (1) to (10), the objective target is a person, and the one or more processors execute the instructions to extract a region including a face of the person in the first image, match feature amounts of the face included in the extracted region with feature amounts of the face of the person stored in a storage in advance, and track the person as the objective target.

(12): In any of the aforementioned aspects (1) to (10), the objective target is a person, and the one or more processors execute the instructions to track, in the second image obtained by converting the first image captured at a second clock time later than a first clock time, the person included in the target region of the second image obtained by converting the first image captured at the first clock time, and extract a region including arms or hands of the person tracked in the first image captured at the second clock time on the basis of a result of the tracking and recognize a gesture of the person on the basis of the extracted region.

(13): In any of the aforementioned aspects (6), (7), and (12), the one or more processors execute the instructions to control the mobile object on the basis of the gesture.

(14): There is provided a mobile object including: the processing apparatus according to any of the aforementioned aspects (1) to (13).

(15): A processing method according to an aspect of the invention includes, by a computer: converting a first image into a second image with a lower resolution than a resolution of the first image; and specifying a target region including a predetermined objective target in the second image on the basis of the second image and specifying a target region including the objective target in the first image on the basis of the specified target region in the second image.

(16): A non-transitory computer storage medium storing instructions according to an aspect of the invention causes a computer to execute: converting a first image into a second image with a lower resolution than a resolution of the first image; and specifying a target region including a predetermined objective target in the second image on the basis of the second image and specifying a target region including the objective target in the first image on the basis of the specified target region in the second image.

According to (1) to (16), the processing apparatus can accurately specify a target while reducing a processing load by converting the first image into the second image with a lower resolution than a resolution of the first image and acquiring the target region including the objective target in the first image on the basis of the target region including the objective target in the second image.

According to (4), the processing apparatus can further accurately track the person by using the features of the person.

According to (6), the processing apparatus can further accurately recognize the gesture of the object that is a subject of motions such as a person, a robot, or an animal.

According to (9) or (10), the processing apparatus can further accurately recognize the gesture by using, with priority, the information regarding the specific region with a higher degree of a chronological change.

According to (11), the processing apparatus can further accurately track the person by using the feature amounts of the face of the person.

According to (13), the processing apparatus can control the mobile object as intended by the person.

BRIEF DESCRIPTION OF THE DRAWINGS

FIG. 5 is a diagram showing processing in which a recognizer tracks the user.

DETAILED DESCRIPTION

Hereinafter, a processing apparatus, a mobile object, a processing method, and a storage medium according to embodiments of the invention will be described with reference to the drawings. As used throughout this disclosure, the singular forms "a", "an", and "the" include plural references unless the context clearly dictates otherwise.

First Embodiment

[Overall Configuration]

Figure 1:
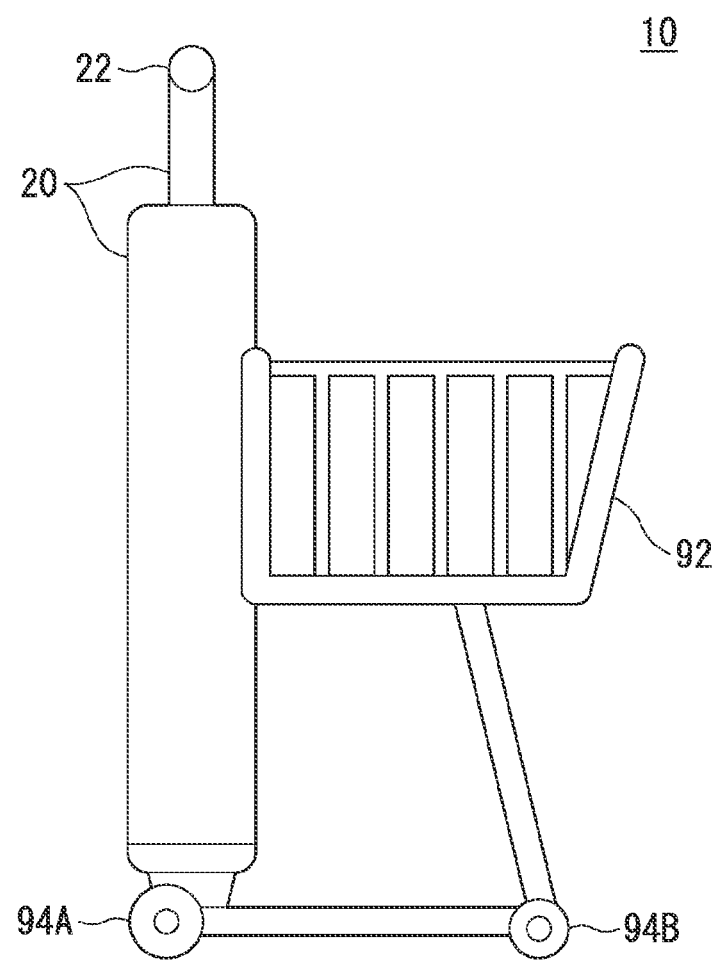
FIG. 1 is a diagram showing an example of a mobile object including a control device according to an embodiment.

FIG. 1 is a diagram showing an example of a mobile object 10 including a processing apparatus according to an embodiment. The mobile object 10 is an autonomous mobile robot. The mobile object 10 assists actions of users. For example, the mobile object 10 assists shopping or customer services for customers or assists operations of staff in accordance with instruction from store staff, customers, and facility staff (hereinafter, these persons will be referred to as "users").

The mobile object 10 includes a main body 20, a container 92, and one or more wheels 94 (wheels 94A and 94B in the drawing). The mobile object 10 moves in accordance with instructions based on gestures or sound of a user, operations performed on an input unit (a touch panel, which will be described later) of the mobile object 10, and operations performed on a terminal device (a smartphone, for example). The mobile object 10 recognizes a gesture on the basis of an image captured by a camera 22 provided in the main body 20, for example.

For example, the mobile object 10 causes the wheels 94 to be driven and moves to follow a customer in accordance with movement of the user or moves to lead the customer. At this time, the mobile object 10 explains items or operations for the user or guides the user to an item or a target that the user is searching for. The user can accommodate items to be purchased or his/her baggage in the container 92 adapted to accommodate these.

Although the present embodiment will be described on the assumption that the mobile object 10 includes the container 92, alternatively (or additionally), the mobile object 10 may be provided with a seat portion in which the user is seated to move along with the mobile object 10, a casing on which the user gets, steps on which the user places his/her feet, and the like. For example, the moving object may be scooter.

Figure 2:
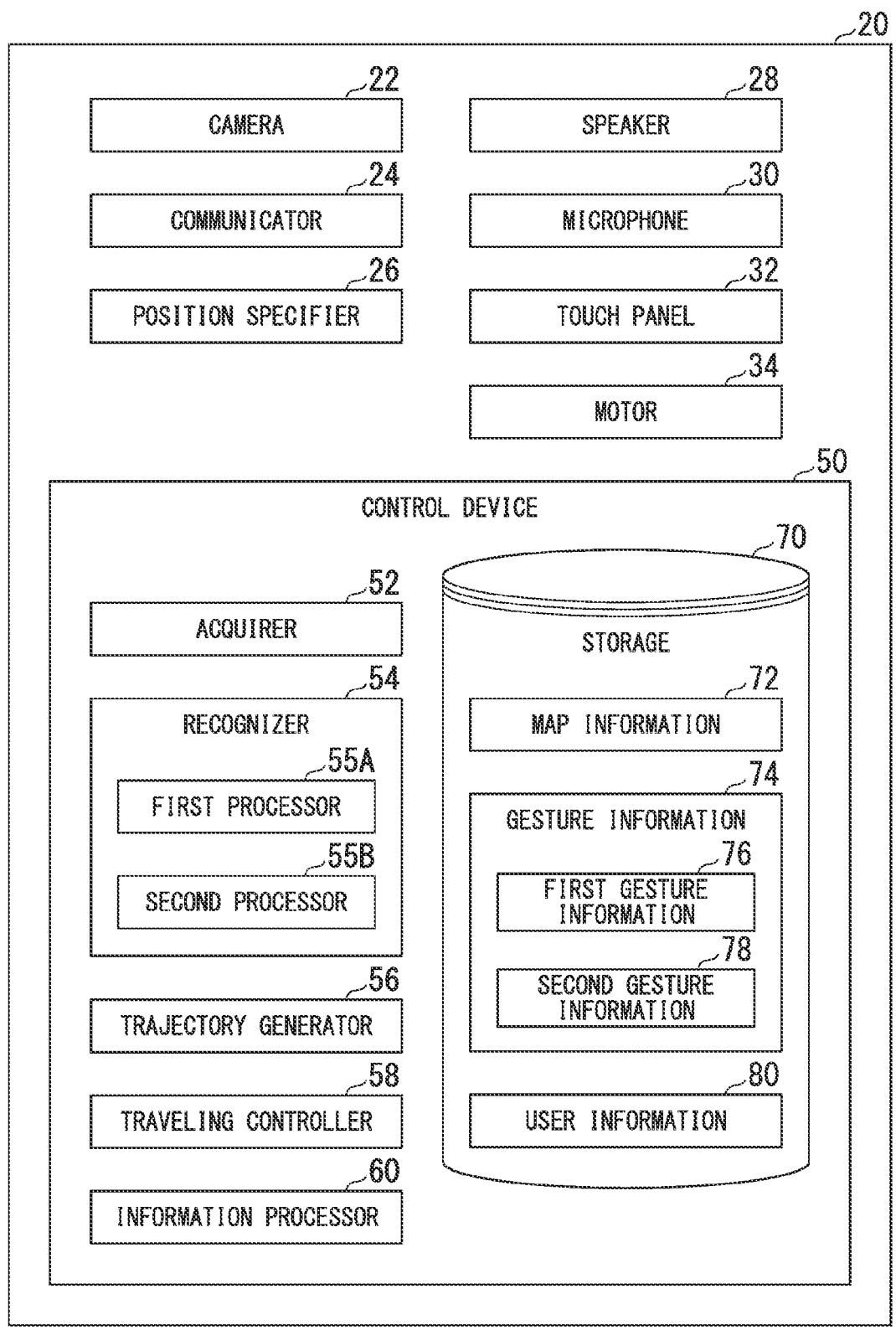
FIG. 2 is a diagram showing an example of functional configurations included in a main body of the mobile object.

FIG. 2 is a diagram showing an example of functional configurations included in the main body 20 of the mobile object 10. The main body 20 includes the camera 22, a communicator 24, a position specifier 26, a speaker 28, a microphone 30, a touch panel 32, a motor 34, and a control device 50 (an example of the "processing apparatus").

The camera 22 images the surroundings of the mobile object 10. The camera 22 is a fisheye camera capable of imaging the surroundings of the mobile object 10 at a wide angle (at 360 degrees, for example), for example. The camera 22 is attached to an upper portion of the mobile object 10, for example, and images the surroundings of the mobile object 10 at a wide angle in the horizontal direction. The camera 22 may be realized by combining a plurality of cameras (a plurality of cameras for imaging a range of 120 degrees and a range of 60 degrees in relation to the horizontal direction). The mobile object 10 may be provided with not only one camera 22 but also a plurality of cameras 22.

The communicator 24 is a communication interface for communication with other devices using a cellular network, a Wi-Fi network, Bluetooth (registered trademark), dedicated short range communication (DSRC), or the like.

The position specifier 26 specifies the position of the mobile object 10. The position specifier 26 acquires position information of the mobile object 10 using a global positioning system (GPS) device (not shown) incorporated in the mobile object 10. The position information may be, for example, two-dimensional map coordinates or latitude/longitude information.

The speaker 28 outputs predetermined sound, for example. The microphone 30 receives sound inputs generated by the user, for example.

The touch panel 32 is configured by a displayed unit such as a liquid crystal display (LCD) or an organic electroluminescence (EL) and an input unit capable of detecting a touch position of an operator using a coordinate detection mechanism with the display unit and the input unit overlapping each other. The display unit displays a graphical user interface (GUI) switch for operations. The input unit generates an operation signal indicating that a touch operation has been performed on the GUI switch and outputs the operation signal to the control device 50 when a touch operation, a flick operation, a swipe operation, or the like on the GUI switch is detected. The control device 50 causes the speaker 28 to output sound and causes the touch panel 32 to display an image in accordance with the operation. The control device 50 may cause the mobile object 10 to move in accordance with the operation.

The motor 34 causes the wheels 94 to be driven and causes the mobile object 10 to move. The wheels 94 includes, for example, a driven wheel that is driven in a rotation direction by a motor 34 and a steering wheel that is a non-driven wheel that is driven in a yaw direction. The mobile object 10 can change a traveling route and turn through adjustment of the angle of the steering wheel.

Although the mobile object 10 includes the wheels 94 as a mechanism for realizing movement in the present embodiment, the present embodiment is not limited to this configuration. For example, the mobile object 10 may be a multi-legged walking robot.

The control device 50 includes, for example, an acquirer 52, a recognizer 54, a trajectory generator 56, a traveling controller 58, an information processor 60, and a storage 70. Some or all of the acquirer 52, the recognizer 54, the trajectory generator 56, the traveling controller 58, and the information processor 60 are realized by a hardware processor such as a central processing unit (CPU), for example, executing a program (software). Some or all of these functional units may be realized by hardware (a circuit unit; including a circuitry) such as large scale integration (LSI), an application specific integrated circuit (ASIC), a field-programmable gate array (FPGA), or a graphics processing unit (GPU) or may be realized by cooperation of software and hardware. The program may be stored in the storage 70 (a storage device including a non-transitory storage medium) such as a hard disk drive (HDD) or a flash memory in advance, or may be stored in a detachable storage medium (non-transitory storage medium) such as a DVD or a CD-ROM and may be installed by the storage medium being attached to a drive device. The acquirer 52, the recognizer 54, the trajectory generator 56, the traveling controller 58, or the information processor 60 may be provided in a device that is different from the control device 50 (mobile object 10). For example, the recognizer 54 may be provided in a different device, and the control device 50 may control the mobile object 10 on the basis of a result of processing performed by the different device. A part or the entirety of information stored in the storage 70 may be stored in a different device. A configuration including one or more functional units out of the acquirer 52, the recognizer 54, the trajectory generator 56, the traveling controller 58, and the information processor 60 may be constituted as a system.

The storage 70 stores map information 72, gesture information 74, and user information 80. The map information 72 is information in which shapes of roads or passages are expressed by links indicating the roads or passages in a facility and nodes connected by the links, for example. The map information 72 may include curvatures of the roads, point-of-interest (POI) information, and the like.

The gesture information 74 is information in which information regarding gestures (feature amounts of templates) and operations of the mobile object 10 are associated with each other. The gesture information 74 includes first gesture information 76 and second gesture information 78. The user information 80 is information indicating feature amounts of the user. Details of the gesture information 74 and the user information 80 will be described later.

The acquirer 52 acquires an image (hereinafter, referred to as a "surrounding image") captured by the camera 22. The acquirer 52 holds the acquired surrounding image as pixel data in a fisheye camera coordinate system, for example.

The recognizer 54 includes, for example, a first processor 55A and a second processor 55B. The first processor 55A converts a first image (a high-resolution image, for example) captured by the camera 22 into a second image (low-resolution image) with lower resolution than that of the first image. The second processor 55B specifies a target region including a predetermined objective target in the second image on the basis of the second image and specifies a target region including the objective target in the first image on the basis of the specified target region in the second image. The objective target is, for example, a target to be tracked. Details of processing performed by the first processor 55A and the second processor 55B will be described later.

The second processor 55B recognizes a body motion (hereinafter, referred to as a "gesture") of the user on the basis of one or more surrounding images. The recognizer 54 recognizes a gesture through matching between feature amounts of the gesture of the user extracted from the surrounding images and feature amounts of a template (feature amounts indicating a gesture). The feature amounts are, for example, data representing feature locations of fingers, finger joints, wrists, arms, a skeleton, and the like of the person, links connecting therebetween, and inclinations and positions of the links, for example.

The trajectory generator 56 generates a trajectory along which the mobile object 10 is to travel in the future on the basis of a gesture of the user, a destination set by the user, objects in the surroundings, the position of the user, the map information 72, and the like. The trajectory generator 56 generates a trajectory along which the mobile object 10 can smoothly move to a goal point, by combining a plurality of arcs. The trajectory generator 56 generates a trajectory by connecting three arcs, for example. The trajectory generator 56 may generate the trajectory by fitting a state to a geometric model such as a Bezier curve, for example. For example, the trajectory is generated as a group of a finite number of trajectory points, in practice.

The trajectory generator 56 performs coordinate conversion between an orthogonal coordinate system and a fisheye camera coordinate system. One-to-one relationships are established between coordinates in the orthogonal coordinate system and the fisheye camera coordinate system, and the relationships are stored as correspondence information in the storage 70. The trajectory generator 56 generates a trajectory in the orthogonal coordinate system (orthogonal coordinate system trajectory) and performs coordinate conversion of the trajectory into a trajectory in the fisheye camera coordinate system (fisheye camera coordinate system trajectory). The trajectory generator 56 calculates a risk of the fisheye camera coordinate system trajectory. The risk is an indicator value indicating how high a probability that the mobile object 10 approaches a barrier is. The risk tends to increase as the distance between the trajectory (trajectory points of the trajectory) and the barrier decreases and tends to decrease as the distance between the trajectory and the barrier increases.

In a case in which a total value of the risk and a risk at each trajectory point satisfy a preset reference (for example, in a case in which the total value is equal to or less than a threshold value Th1, and the risk at each trajectory point is equal to or less than a threshold value Th2), the trajectory generator 56 employs a trajectory that satisfies the reference as a trajectory along which the mobile object will move.

In a case in which the aforementioned trajectory does not satisfy the preset reference, the following processing may be performed. The trajectory generator 56 detects a traveling available space in the fisheye camera coordinate system and performs coordinate conversion of the detected traveling available space in the fisheye camera coordinate system into a traveling available space in the orthogonal coordinate system. The traveling available space is a space excluding regions of barriers and regions in the surroundings of the barriers (regions where risks are set or regions where risks are equal to or greater than the threshold values) in a region in the direction of the movement of the mobile object 10. The trajectory generator 56 corrects the trajectory such that the trajectory falls within the range of the traveling available space in the orthogonal coordinate system after the coordinate conversion. The trajectory generator 56 performs coordinate conversion of the orthogonal coordinate system trajectory into the fisheye camera coordinate system trajectory and calculates a risk of the fisheye camera coordinate system trajectory on the basis of the surrounding images and the fisheye camera coordinate system trajectory. The processing is repeated to search for the trajectory that satisfies the aforementioned preset reference.

The traveling controller 58 causes the mobile object 10 to travel along the trajectory that satisfies the preset reference. The traveling controller 58 outputs a command value for causing the mobile object 10 to travel along the trajectory to the motor 34. The motor 34 causes the wheels 94 to rotate in accordance with the command value and causes the mobile object 10 to move along the trajectory.

The information processor 60 controls various devices and machines included in the main body 20. The information processor 60 controls, for example, the speaker 28, the microphone 30, and the touch panel 32. The information processor 60 recognizes sound input to the microphone 30 and operations performed on the touch panel 32. The information processor 60 causes the mobile object 10 to operate on the basis of a result of the recognition.

Although the aforementioned example has been described on the assumption that the recognizer 54 uses the image captured by the camera 22 provided in the mobile object 10 for various kinds of processing, the recognizer 54 may perform various kinds of processing using an image captured by a camera that is not provided in the mobile object 10 (the camera that is provided at a position different from that of the mobile object 10). In this case, the image captured by the camera is transmitted to the control device 50 via communication, and the control device 50 acquires the transmitted image and executes various kinds of processing on the basis of the acquired image. The recognizer 54 may execute various kinds of processing using a plurality of images. For example, the recognizer 54 may execute various kinds of processing on the basis of an image captured by the camera 22 or a plurality of images captured by the camera provided at a position different from that of the mobile object 10.

[Assist Processing]

The mobile object 10 executes assist processing for assisting shopping of the user. The assist processing includes processing related to tracking and processing related to action control.

[Processing Related to Tracking (Part 1)]

Figure 3:
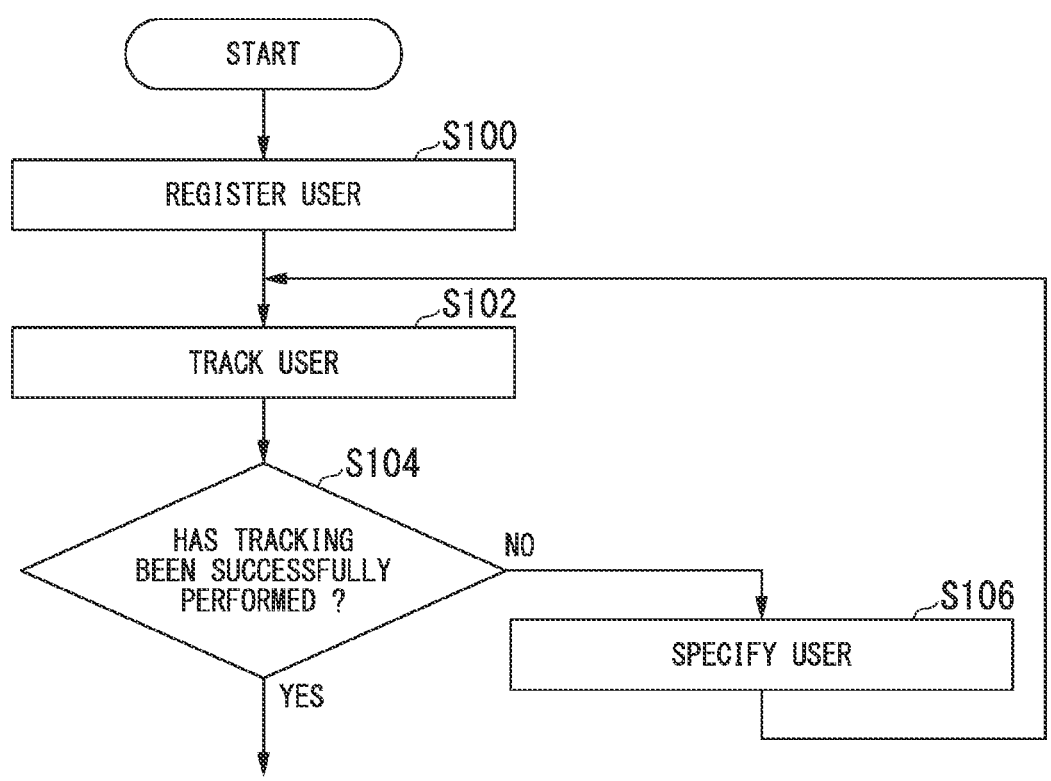
FIG. 3 is a flowchart showing an example of a tracking processing flow.

FIG. 3 is a flowchart showing an example of a tracking processing flow. First, the control device 50 of the mobile object 10 receives a user's registration (Step S100). Next, the control device 50 tracks the user registered in Step S100 (Step S102). Next, the control device 50 determines whether or not the tracking has successfully been performed (Step S104). In a case in which the tracking has successfully been performed, the processing proceeds to Step S200 in FIG. 10, which will be described later. In a case in which the tracking has not successfully been performed, the control device 50 specifies the user (Step S106).

(Processing of Registering User)

The processing of registering the user in Step S100 will be described. The control device 50 of the mobile object 10 checks a registration intention of the user on the basis of a specific gesture, sound, or operations performed on the touch panel 32 of the user (a customer who visits a shop, for example). In a case in which a registration intension of the user can be confirmed, the recognizer 54 of the control device 50 extracts feature amounts of the user and registers the extracted feature amounts.

Figure 4:
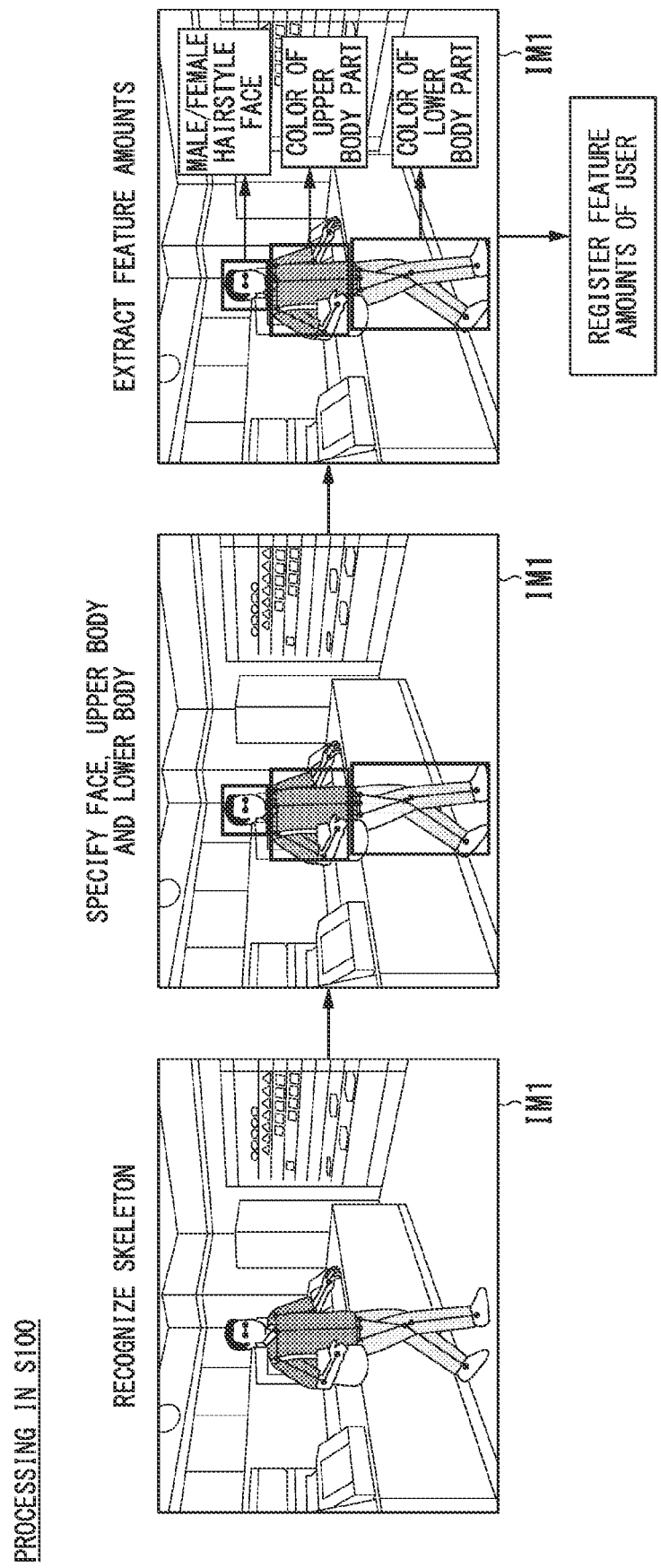
FIG. 4 is a diagram showing processing for extracting feature amounts of a user and processing of registering the feature amounts.

FIG. 4 is a diagram showing the processing of extracting the feature amounts of the user and the processing of registering the feature amounts. The second processor 55B of the control device 50 specifies the user from an image IM1 capturing the user and recognizes joint points and a skeleton of the specified user (executes skeleton processing). For example, the second processor 55B estimates a face, face parts, a neck, shoulders, elbows, wrists, waist, ankles, and the like of the user from the image IM1 and executes skeleton processing on the basis of the estimated position of each part. For example, the second processor 55B executes the skeleton processing using a known method (for example, an open pose method) for estimating the joint points and the skeleton of the user using deep learning. Next, the second processor 55B specifies the face, the upper body, the lower body, and the like of the user on the basis of a result of the skeleton processing, extracts feature amounts of the specified face, upper body, and lower body, and registers the extracted feature amounts as feature amounts of the user in the storage 70. The feature amounts of the face are, for example, feature amounts of a male or a female, a hairstyle, and a face. The feature amounts indicating a male or a female are feature amounts indicating the shape of the head and the like, and the hairstyle is information indicating how long the hair is (short hair, long hair, or the like) obtained from the shape of the head. The feature amounts of the upper body include, for example, a color of the upper body part. The feature amounts of the lower body include, for example, a color of the lower body part.

(Processing of Tracking User)

The first processor 55A converts each high-resolution image captured at every unit time into a low-resolution image. For example, high resolution means that the number of pixels per unit region in the image is larger than the number of pixels per unit region in the low-resolution image (dpi is higher). The first processor 55A performs processing of thinning out the pixels in the high-resolution image IM to covert the high-resolution image into a low-resolution image or applies a predetermined algorithm to convert the high-resolution image into a low-resolution image.

The second processor 55B analyzes a low-resolution image obtained by converting a high-resolution image captured at a first clock time and a low-resolution image obtained by converting a high-resolution image captured at a second clock time later than the first clock time and tracks, in the low-resolution image corresponding to the second clock time, an objective target included in a target region including the objective target that is a target of tracking in the low-resolution image corresponding to the first clock time. The second processor 55B tracks the objective target in the low-resolution image on the basis of a change in positions of the objective target in chronological low-resolution images obtained by converting high-resolution images captured in a chronological manner. The low-resolution image used for the tracking is, for example, a low-resolution image obtained by converting a high-resolution image most recently captured. A specific description will be provided below.

The processing for tracking the user in Step S102 will be described. FIG. 5 is a diagram showing the processing in which the recognizer 54 tracks the user (the processing in Step S102 in FIG. 3). The first processor 55A of the recognizer 54 acquires an image captured at a clock time T. The image is an image captured by the camera 22 (hereinafter, a high-resolution image IM2).

The first processor 55A of the recognizer 54 converts the high-resolution image IM2 into a low-resolution image IM2 # with a lower resolution than that of the high-resolution image IM2. Next, the second processor 55B extracts a person and a person detection region including the person from the low-resolution image IM2 #.

The second processor 55B estimates the position of the user (person detection region) at the clock time T on the basis of the position of the person detected at a clock time T−1 (before the clock time T) (the person detection region of the user tracked at the clock time T−1) and a moving direction of the person. In a case in which the user detected in the low-resolution image IM2 obtained at the clock time T is present near the position of the user as the tracking target before the clock time T−1 or the position estimated from the moving direction, the second processor 55B specifies the user detected at the clock time T as the user of the target to be tracked (tracking target). In a case in which the user can be specified, the tracking is regarded as having been successfully performed.

Since the control device 50 tracks the user using the low-resolution image IM2 # as described above, a processing load is reduced.

Figure 6:
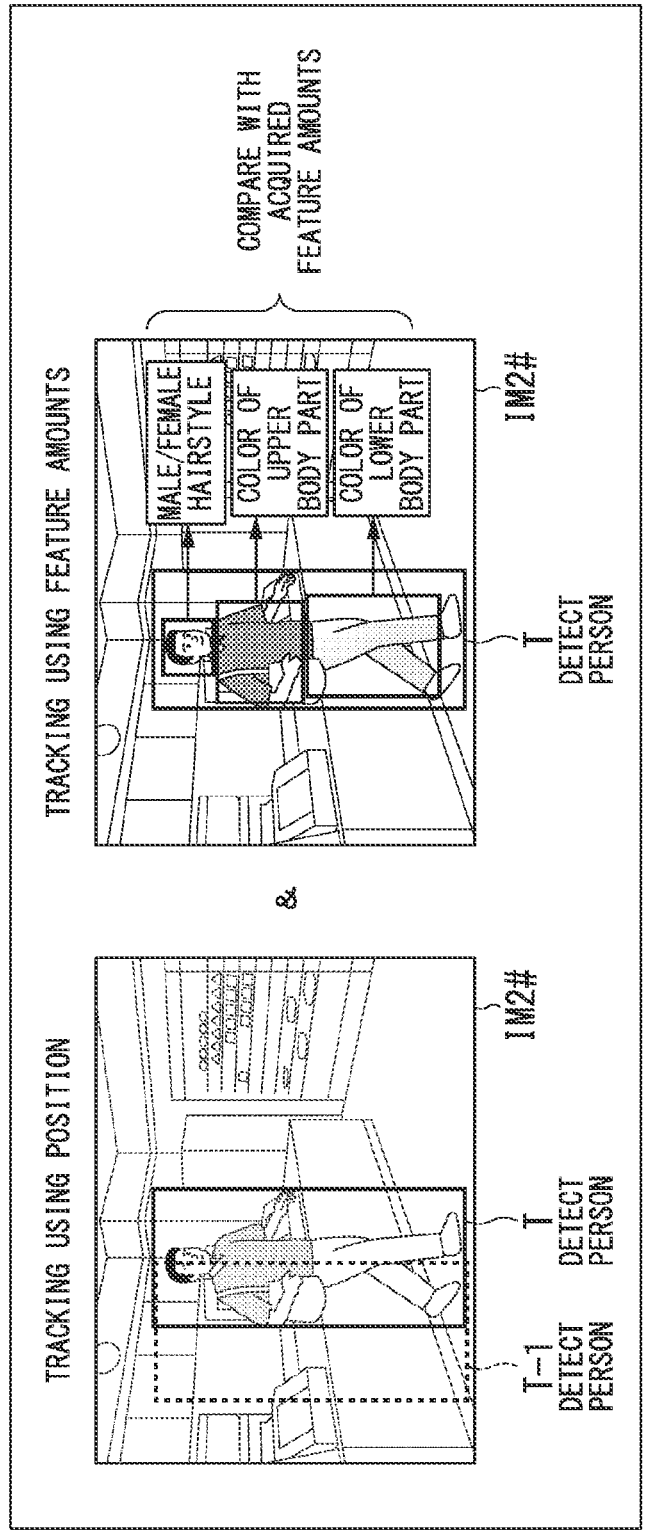
FIG. 6 is a diagram showing the tracking processing using the feature amounts.

The second processor 55B may track the user further using the feature amounts of the user in addition to the positions of the user at the clock time T and the clock time T−1 as described above in the tracking processing. FIG. 6 is a diagram showing the tracking processing using the feature amounts. For example, the second processor 55B estimates the position of the user at the clock time T, specifies the user who is present near the estimated position, and further extracts the feature amounts of the user. In a case in which the extracted feature amounts conform to the registered feature amounts by amounts equal to or greater than a threshold value, the control device 50 estimates the specified user as a user who is a tracking target and determines that the tracking has successfully been performed.

For example, when the feature amounts of the user are extracted, the second processor 55B extracts a region including the person and performs skeleton processing on the image (high-resolution image) in the extracted region to extract feature amounts of the person. In this manner, the processing load is reduced.

The second processor 55B may estimate the specified user as a user who is a tracking target in a case in which feature amounts obtained from the low-resolution image, instead of the feature amounts obtained from the high-resolution image, and the registered feature amounts conform to each other by amounts equal to or greater than a threshold value. In this case, feature amounts to be compared with the feature amounts obtained from the low-resolution image are stored in the storage 70 in advance, and the feature amounts are used. The second processor 55B may compare feature amounts extracted from an image obtained during tracking, for example, instead of (or in addition to) the registered feature amounts with feature amounts obtained from the image captured this time to specify the user.

Even in a case in which the user who is the tracking target overlaps or intersect another person, for example, the user is further accurately tracked on the basis of a change in the position of the user and the feature amounts of the user as described above.

(Processing for Specifying User)

Figure 7:
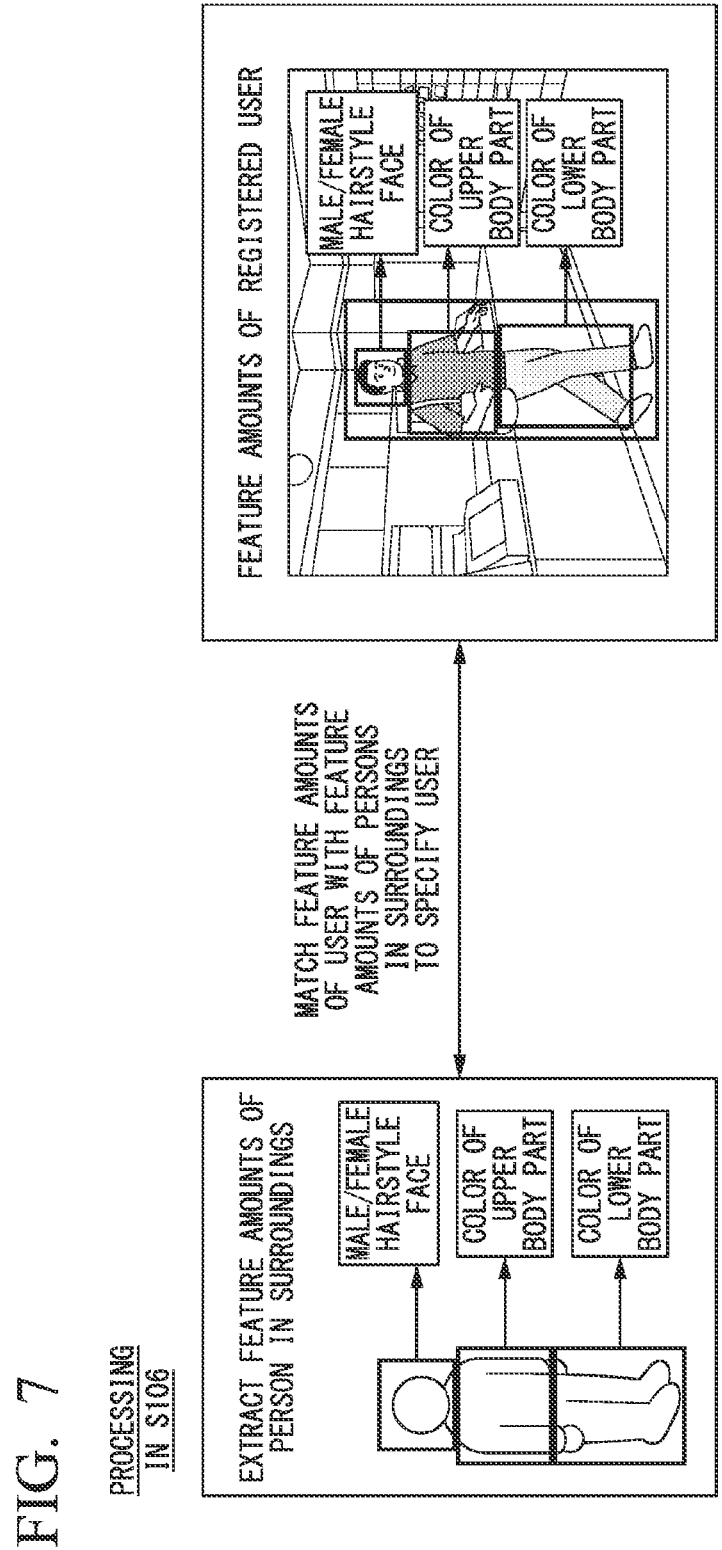
FIG. 7 is a diagram showing the tracking processing using the feature amounts.

The processing for specifying the user in Step S106 will be described. In a case in which the tracking of the user has not successfully been performed, the second processor 55B matches the feature amounts of the person in the surroundings with the registered feature amounts of the user to specify the user who is the tracking target as shown in FIG. 7. The second processor 55B extracts feature amounts of each person included in the image, for example. The second processor 55B matches the feature amounts of each person with the registered feature amounts of the user to specify a person with feature amounts that conform to the registered feature amounts of the user by amounts equal to or greater a threshold value. The second processor 55B regards the specified person as the user who is the tracking target. The feature amounts used at this time may be feature amounts obtained from the low-resolution image or may be feature amounts obtained from the high-resolution image.

The second processor 55B of the control device 50 can more accurately track the user through the aforementioned processing.

[Processing Related to Tracking (Part 2)]

Although the aforementioned example has been described on the assumption that the user is a customer who has visited the shop, the following processing may be performed in a case in which the user is a store staff or a facility staff (a person who is a health care worker in a facility, for example).
(Processing for Registering User)

Figure 8:
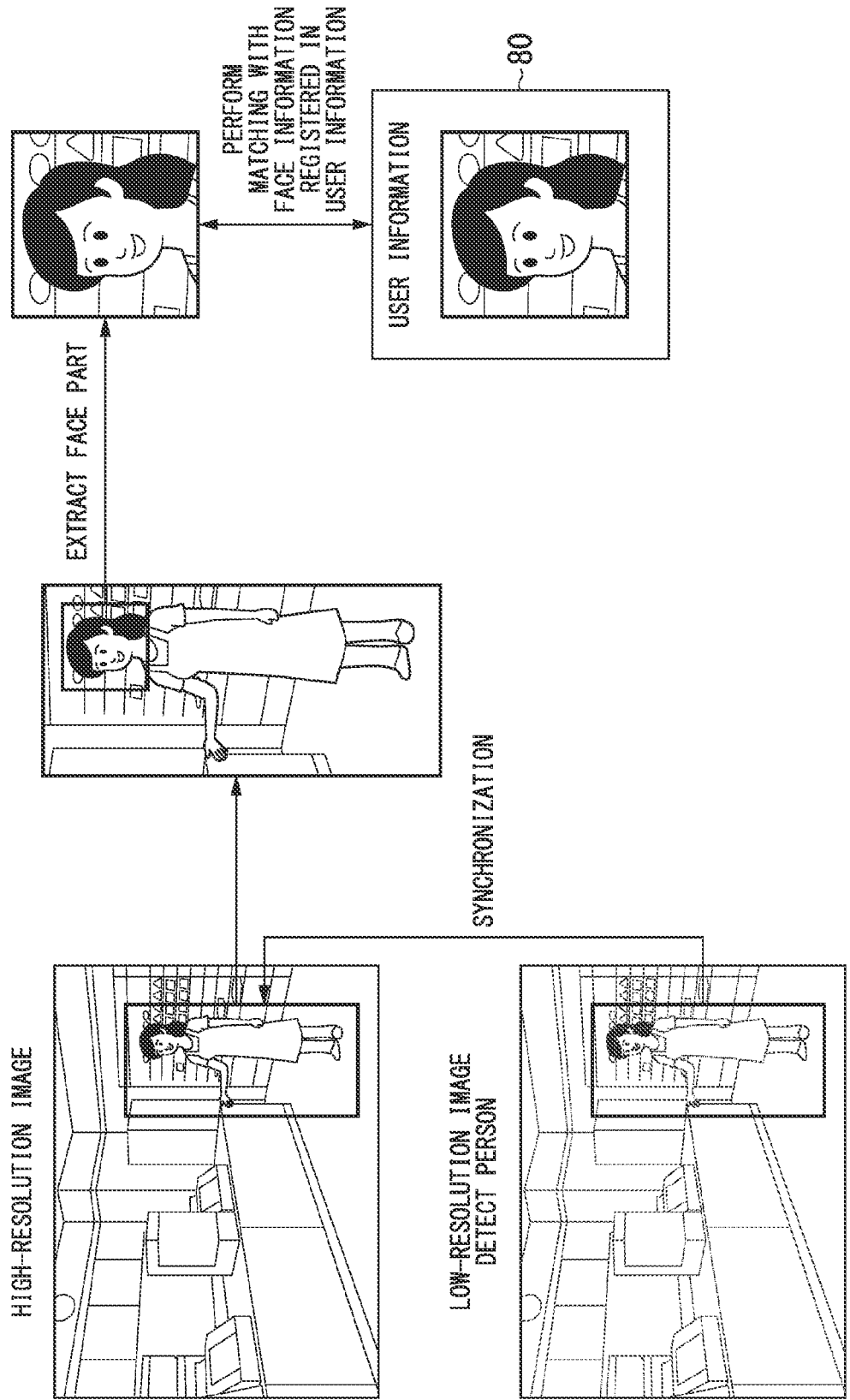
FIG. 8 is a diagram showing another example of processing in which a second processor tracks the user.

The processing for tracking the user in Step S102 may be performed as follows. FIG. 8 is a diagram showing another example of processing in which the second processor 55B tracks the user (the processing in Step S102 in FIG. 3). The second processor 55B extracts a region including a person from a low-resolution image and extracts a region (a region including the person) corresponding to the extracted region in a high-resolution image. The second processor 55B further extracts a region including a face part of the person from the region extracted from the high-resolution image and extracts feature amounts of the face part of the person. The second processor 55B matches the extracted feature amounts of the face part with feature amounts of the face part of the user who is a tracking target registered in advance in the user information 80, and in a case in which the feature amounts conform to each other, the second processor 55B determines that the person included in the image is the user who is the tracking target.
(Processing for Specifying User)

Figure 9:
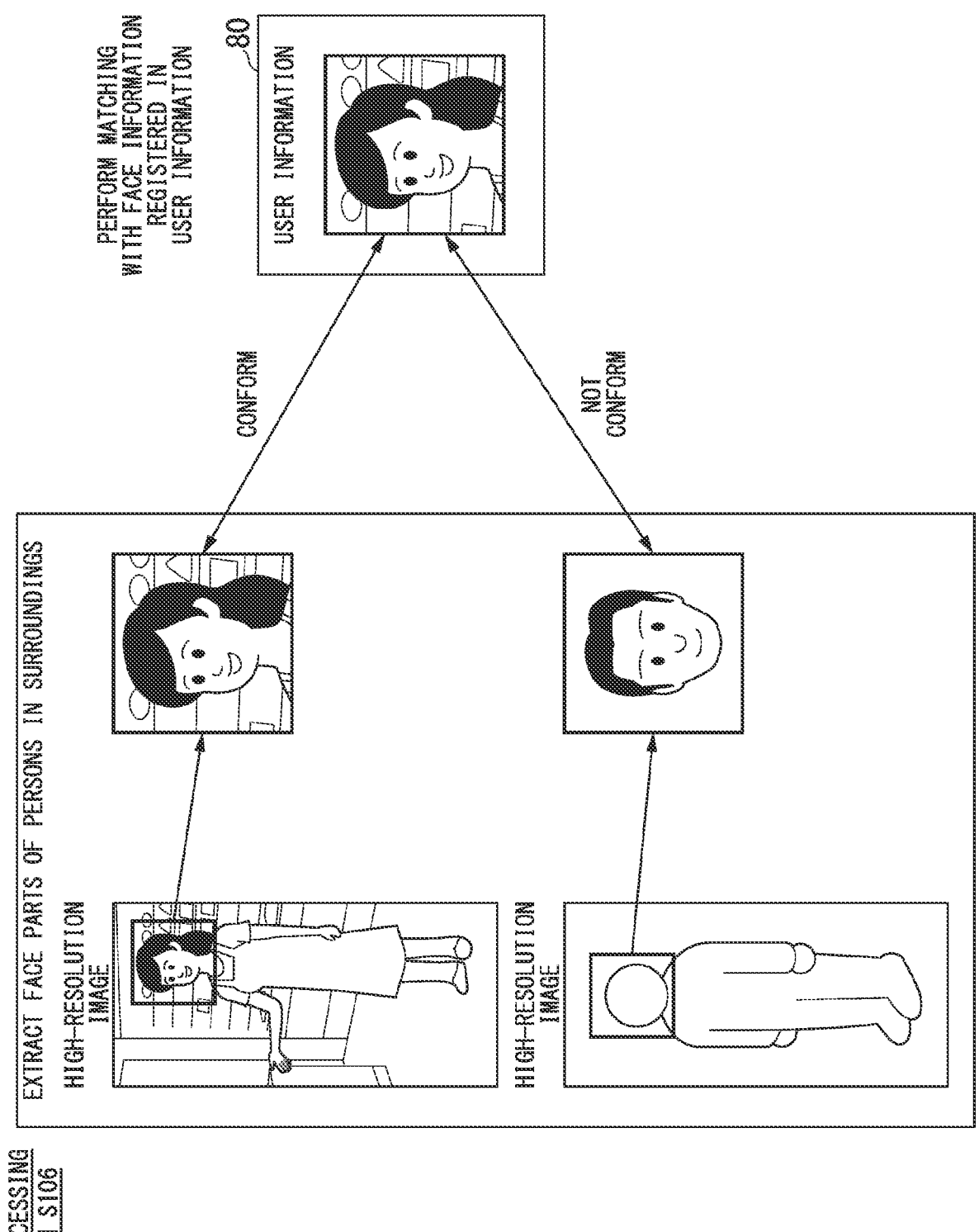
FIG. 9 is a diagram showing an example of processing for extracting a region including persons in surroundings from a high-resolution image.

The processing for specifying the user in Step S106 may be performed as follows. In a case in which the tracking of the user has not successfully been performed, the second processor 55B extracts a region including a person in the surroundings from the high-resolution image as shown in FIG. 9. The second processor 55B extracts a region including a face part of the person from the extracted region, extracts feature amounts of the face part of the person, matches the feature amounts of the face of the person in the surroundings with the feature amounts of the registered user, and specifies the person with the feature amounts that conform to the registered feature amounts by amounts equal to or greater than a threshold value as the user who is the tracking target.

As described above, the control device 50 can further accurately track the user. Since the control device 50 extracts the person using the low-resolution image and further extracts the person using the high-resolution image as needed, it is possible to reduce a processing load.

[Processing Related to Action Control]

Figure 10:
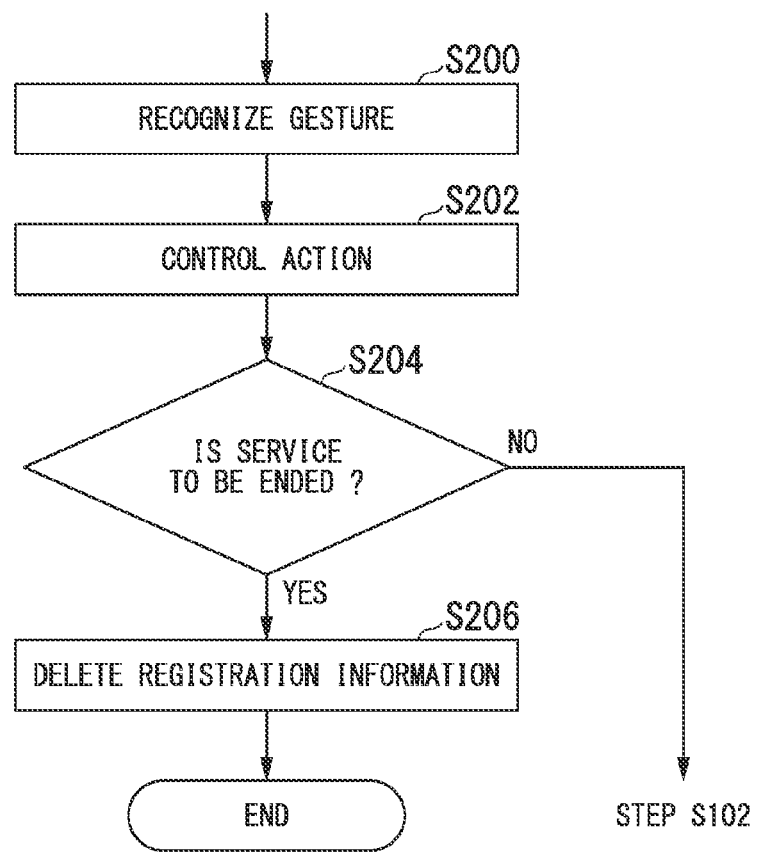
FIG. 10 is a flowchart showing an example of an action control processing flow.

FIG. 10 is a flowchart showing an example of an action control processing flow. The processing is processing executed after the processing in Step S104 in FIG. 3. The control device 50 recognizes a gesture of the user (Step S200) and controls actions of the mobile object 10 on the basis of the recognized gesture (Step S202). Next, the control device 50 determines whether or not to end the service (Step S204). In a case in which the service is not to be ended, the processing returns to Step S102 in FIG. 3 to continue the tracking. In a case in which the service is to be ended, the control device 50 deletes the registration information registered in association with the user, such as the feature amounts of the user (Step S206). In a case in which the user performs a gesture, an operation or the like or inputs sound indicating his/her intention to end the service, for example, the service is ended. In a case in which the user or the mobile object 10 reaches a boundary to the outside of a service provision area, the provision of the service is ended. In this manner, one routine of the flowchart ends.

Figure 11:
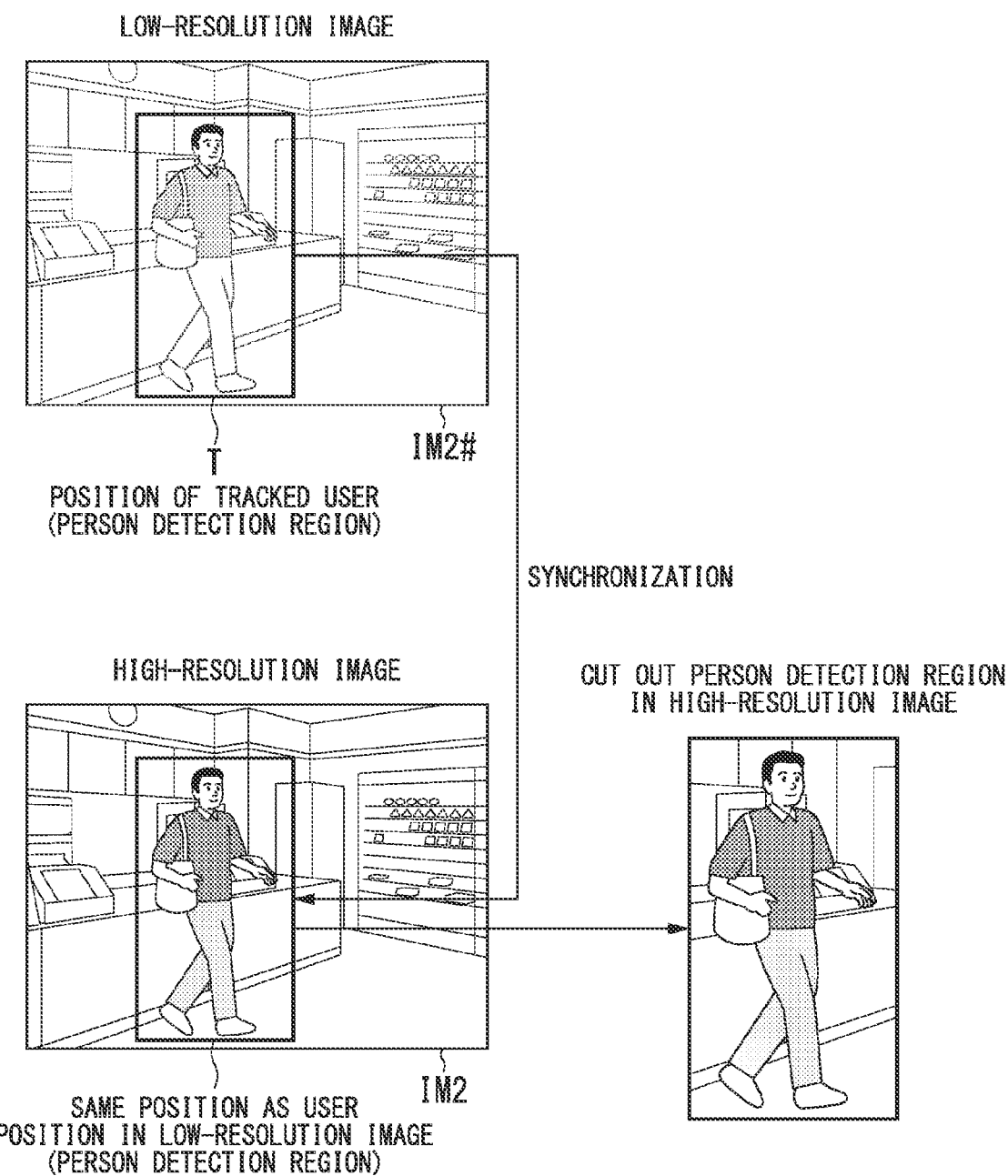
FIG. 11 is a diagram (part 1) showing processing for recognizing a gesture.

The processing in Step S200 will be described. FIG. 11 is a diagram (part 1) showing the processing for recognizing a gesture. The second processor 55B specifies the same person detection region (target region) as the person detection region including the user who is being tracked detected in the low-resolution image IM2 # corresponding to the clock time T in the high-resolution image IM corresponding to the clock time T. Then, the second processor 55B cuts out (extracts) the specified person detection region (target region) in the high-resolution image IM. The specified or cut-out person detection region (target region) is not limited to the same person detection region as the aforementioned person detection region including the user who is being tracked and may be a person detection region (target region) including the person detection region including the aforementioned user. For example, a region including another region in addition to the aforementioned person detection region including the user may be specified, cut out, and regarded as the target region.

The second processor 55B executes image recognition processing on the cut-out person detection region. The image recognition processing includes processing for recognizing a gesture of the person, skeleton processing, processing for specifying a region including arms or hands of the person, or processing of extracting a region with a high degree of change in motions (of the arms or the hands, for example) of the user. These will be described below.

Figure 12:
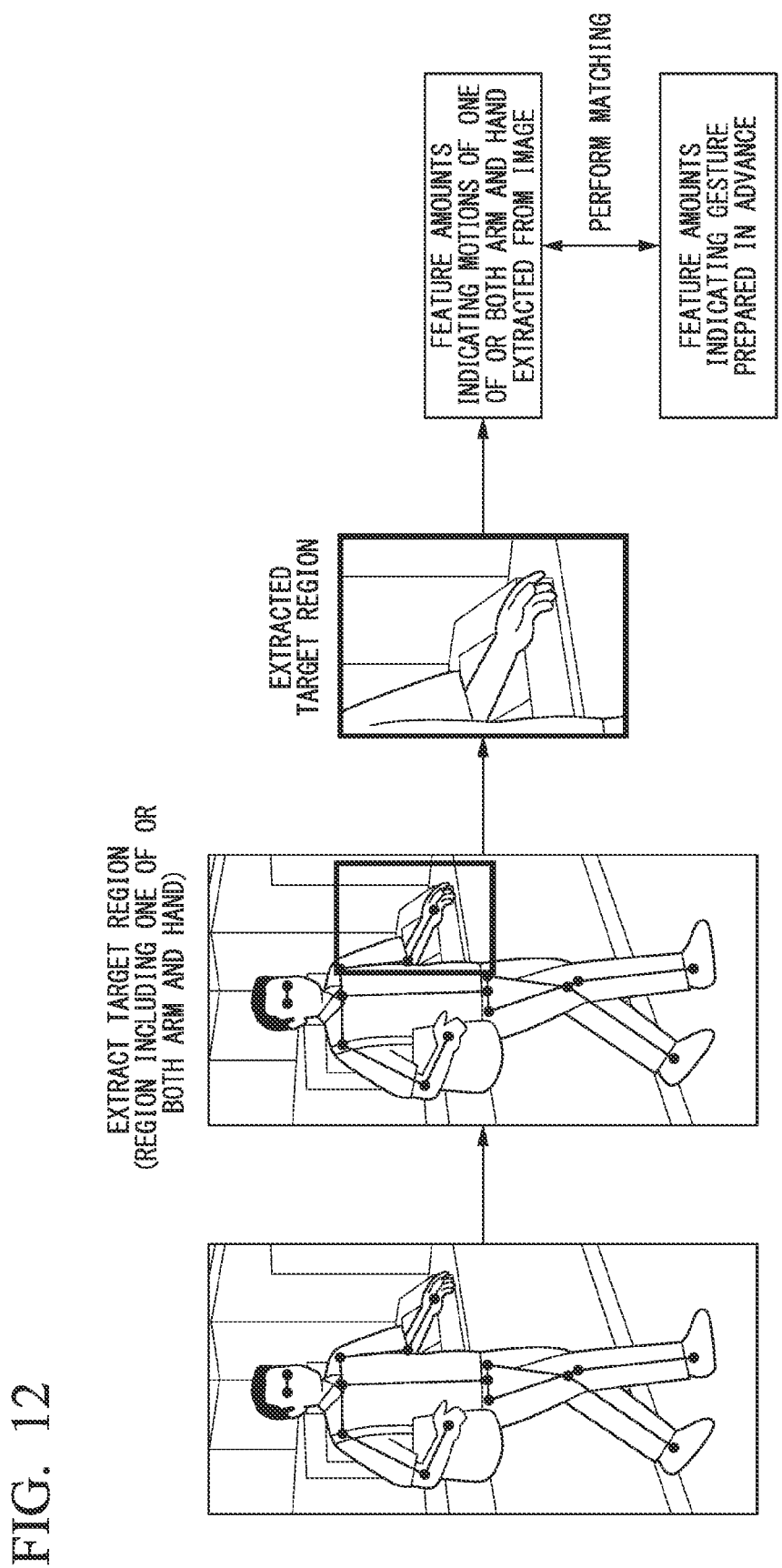
FIG. 12 is a diagram (part 2) showing the processing for recognizing a gesture.

FIG. 12 is a diagram (part 2) showing the processing for recognizing a gesture. The second processor 55B performs skeleton processing on an image of the user included in the cut person detection region. The second processor 55B extracts a region (hereinafter, an objective region) including one of or both the arms and hands from the result of the skeleton processing and extracts feature amounts indicating a state of the one of or both the arms and hands in the extracted objective region. The objective region (an example of the "specific region") is, for example, a region used to recognize a gesture. The second processor 55B specifies feature amounts to be matched with the aforementioned feature amounts indicating the state from the feature amounts included in the gesture information 74. The control device 50 causes the mobile object 10 to execute operations of the mobile object 10 related to the specified feature amounts in the gesture information 74. Which of a region including the hands or a region including the arms is to be extracted is determined depending on the position of the user relative to the mobile object 10. In a case in which the user is not separated from the mobile object 10 by a predetermined distance or more, for example, the region including the hand is extracted. In a case in which the user is separated from the mobile object 10 by the predetermined distance or more, the region including the arms is extracted.

Figure 13:
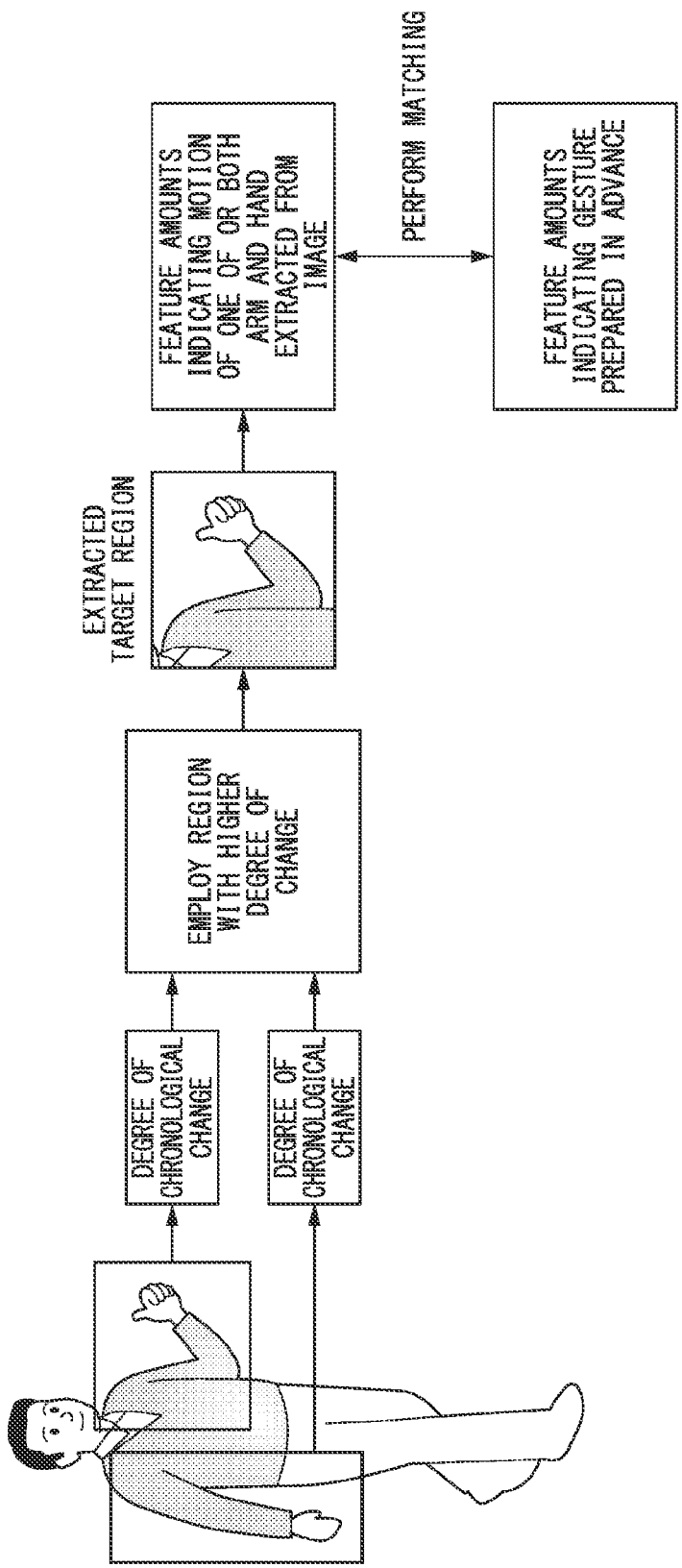
FIG. 13 is a diagram (part 3) showing the processing for recognizing a gesture.

FIG. 13 is a diagram (part 3) showing the processing for recognizing a gesture. The second processor 55B may recognize a gesture using, with higher priority, information regarding a region with a high degree of chronological change in motions of a person (a region including parts with high degrees of change among parts). The second processor 55B extracts the region (specific region) including the arms or the hands with a high degree of change out of a first degree of change in the left arm or the left hand of the user and a second degree of change in the right arm or the right hand of the user on the basis of the result of the skeleton processing performed on the high-resolution images captured in a chronological manner and recognizes a gesture of the user performed with the arm or the hand included in the extracted region. In other words, the second processor 55B recognizes a gesture using, with higher priority, the information regarding the region with a higher degree of chronological change (a degree of change in the arm or the hand, for example) out of the two or more regions (specific regions). The two or more regions include at least the specific region specified as a region including the right arm or the right hand of the objective target and a specific region specified as a region including the left arm or the left hand of the objective target.

The second processor 55B extracts, as the target region, the region including the left arm or the left hand with a higher degree of change out of the degree of the chronological change in right arm or right hand of the user and the degree of the chronological change in left arm or left hand as shown in FIG. 13, for example. The second processor 55B recognizes a gesture of the left arm or the left hands with a high degree of change, for example.

The second processor 55B may determine which of the right arm or hand and the left arm or hand of the user the gesture for controlling the mobile object 10 is being performed with instead of the aforementioned determination, and then recognize a gesture on the basis of the result of the determination.

Although the aforementioned example has been described on the assumption that the tracking target is a person, alternatively (or additionally), the tracking target may be an object as a subject of actions such as a robot or an animal. In this case, the second processor 55B recognizes a gesture of the object such as the robot or the animal.

(Processing for Recognizing Gesture)

Figure 14:
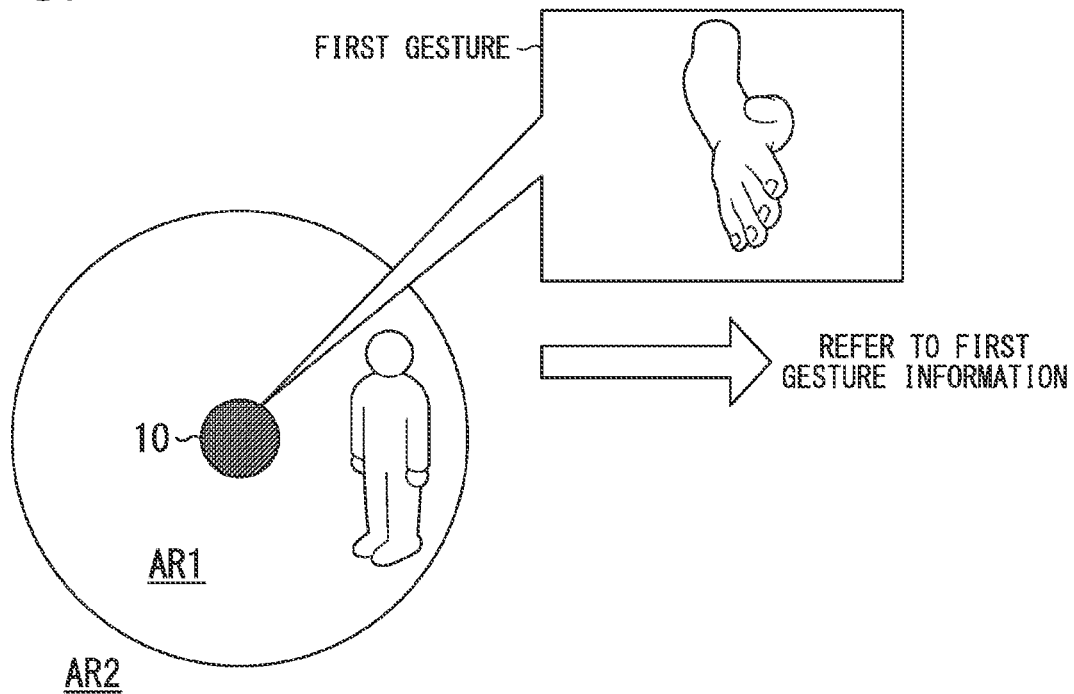
FIG. 14 is a diagram showing the processing for recognizing a gesture.

The control device 50 determines which of first gesture information 76 and second gesture information 78 of the gesture information 74 is to be referred to on the basis of the relative positions of the mobile object 10 and the user. In a case in which the user is not separated from the mobile object 10 by the predetermined distance as shown in FIG. 14, in other words, in a case in which the user is present in a first region AR1 set with reference to the mobile object 10, the control device 50 determines whether the user is performing the same gesture as a first gesture included in the first gesture information 76.

Figure 15:
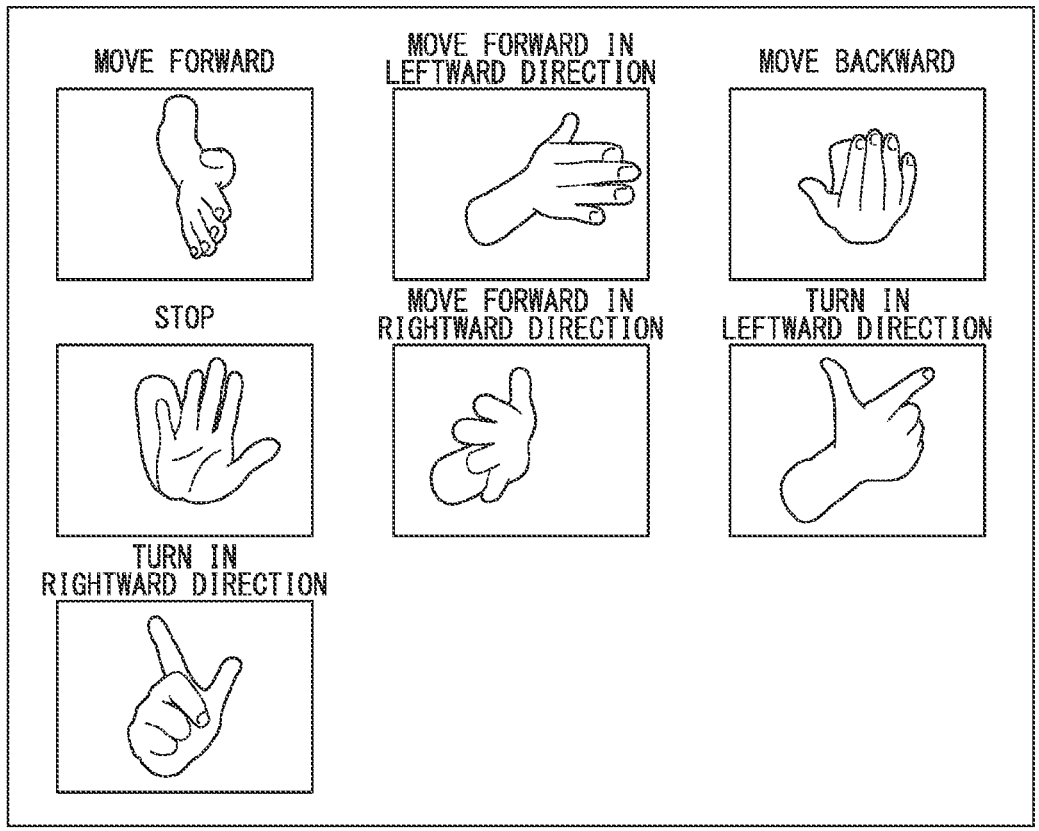
FIG. 15 is a diagram showing an example of a first gesture included in first gesture information.

FIG. 15 is a diagram showing an example of the first gesture included in the first gesture information 76. The first gesture is a gesture using a hand without using an arm as described below, for example.

A gesture of moving the mobile object 10 ahead: this gesture is a gesture of stretching the hand forward.

A gesture of stopping the mobile object 10 moving ahead: this gesture is a gesture of placing the palm to face the forward direction of the user.

A gesture of moving the mobile object 10 in the leftward direction: this gesture is a gesture of moving the hand in the leftward direction.

A gesture of moving the mobile object 10 in the rightward direction: this gesture is a gesture of moving the hand in the rightward direction.

A gesture of moving the mobile object 10 backward: this gesture is a gesture of repeating an operation of moving fingertips such that the fingertips face the direction of the user (such that the fingertips approach the palm) with the palm directed in the vertically opposite direction (a beckoning gesture).

A gesture of causing the mobile object 10 to turn in the leftward direction: this gesture is a gesture of stretching the index finger and the thumb (or a predetermined finger) and turning the stretched fingers in the leftward direction.

A gesture of causing the mobile object 10 to turn in the rightward direction: this gesture is a gesture of stretching the index finger and the thumb (or a predetermined finger) and turning the stretched fingers in the rightward direction.

Figure 16:
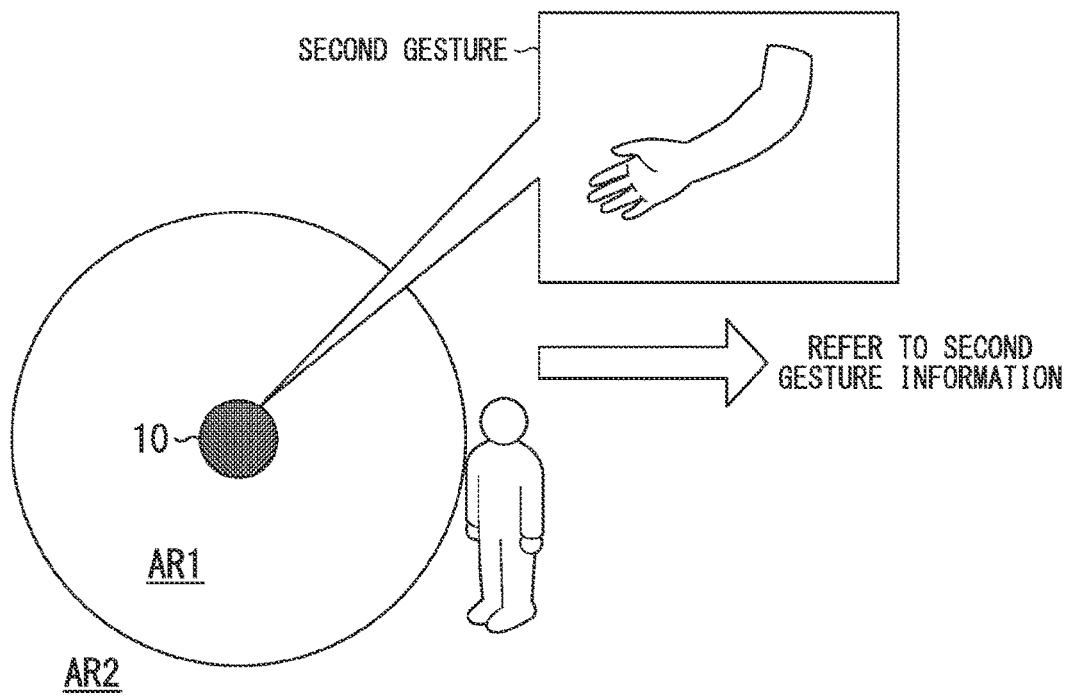
FIG. 16 is a diagram showing the processing for recognizing a gesture.

In a case in which the user is separated from the mobile object 10 by a predetermined distance as shown in FIG. 16, in other words, in a case in which the user is present in a second region AR2 set with reference to the mobile object 10 (in a case in which the user is not present in the first region AR1), the control device 50 determines whether or not the user is performing the same gesture as the second gesture included in the second gesture information 78.

The second gesture is a gesture using an arm (an arm between the elbow and the hand) and the hand. The second gesture may be any body action such as a larger body motion or hand motion than the first gesture. The large body action means that the body action of the second gesture is larger than the body action of the first gesture in a case in which the mobile object 10 is caused to perform a certain action (the same action such as moving straight ahead). For example, the first action may be a gesture using a hand or fingers while the second gesture may be a gesture using an arm. For example, the first action may be a gesture using a foot below the knee while the second gesture may be a gesture using the lower body. For example, the first action may be a gesture using a hand, a foot, or the like while the second gesture may be a gesture using the entire body, such as jumping.

If the camera 22 of the mobile object 10 images the user who is present in the first region AR1 as shown in FIG. 14 as described above, the arm part is unlikely to be captured in the image, and the hand and the fingers are captured in the image. The first region AR1 is a region in which it is not possible or it is difficult for the recognizer 54 to recognize the arm of the user from the image capturing the user who is present in the first region AR1. If the camera 22 of the mobile object 10 images the user who is present in the second region AR2 as shown in FIG. 16, the arm part is captured in the image. Therefore, the recognizer 54 recognizes the gesture using the first gesture information 76 in the case in which the user is present in the first region AR1 as described above, while the recognizer 54 recognizes the gesture using the second gesture information 78 in a case in which the user is present in the second region AR2, and it is thus possible to more accurately recognize the gesture of the user.

Figure 17:
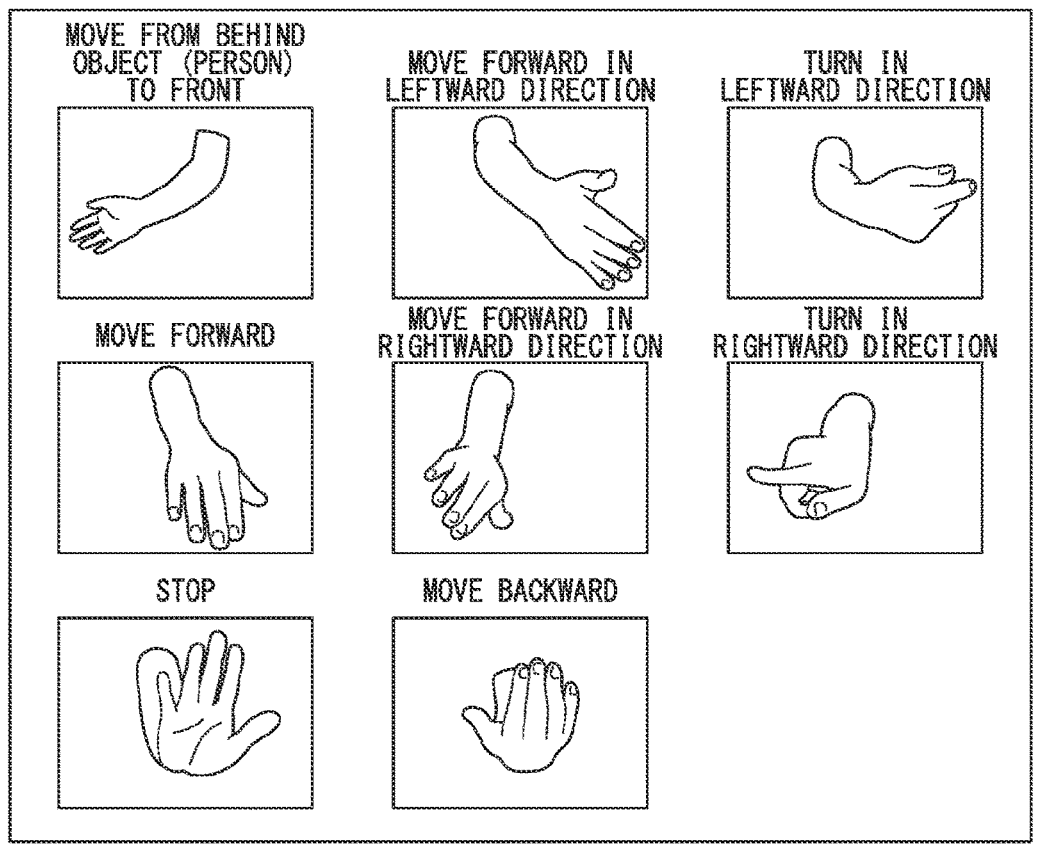
FIG. 17 is a diagram showing an example of a second gesture included in second gesture information.

FIG. 17 is a diagram showing an example showing the second gesture included in the second gesture information 78.

A gesture of moving the mobile object 10 located behind the user to the front of the body of the user: this gesture is a gesture of the user pushing his/her arm and hand to the front from a part near the body.

A gesture of moving the mobile object 10 forward: this gesture is a gesture of stretching the arm and the hand forward.

A gesture of stopping the mobile object 10 moving forward: this gesture is a gesture of causing the palm out of the arm and the hand stretched forward to face the forward direction.

A gesture of moving the mobile object 10 in the leftward direction: this gesture is a gesture of moving the arm and the hand in the leftward direction.

A gesture of moving the mobile object 10 in the rightward direction: this gesture is a gesture of moving the arm and the hand in the rightward direction.

A gesture of moving the mobile object 10 backward: this gesture is a gesture of repeating an operation of moving the arm or the wrist such that the fingertips face the direction of the user with the palm directed in the vertically opposite direction (a beckoning gesture).

A gesture of causing the mobile object 10 to turn in the leftward direction: this gesture is a gesture of stretching the index finger (or a predetermined finger) and turning the stretched finger in the leftward direction.

A gesture of causing the mobile object 10 to turn in the rightward direction: this gesture is a gesture of stretching the index finger (or a predetermined finger) and turning the stretched finger in the rightward direction.

[Flowchart]

Figure 18:
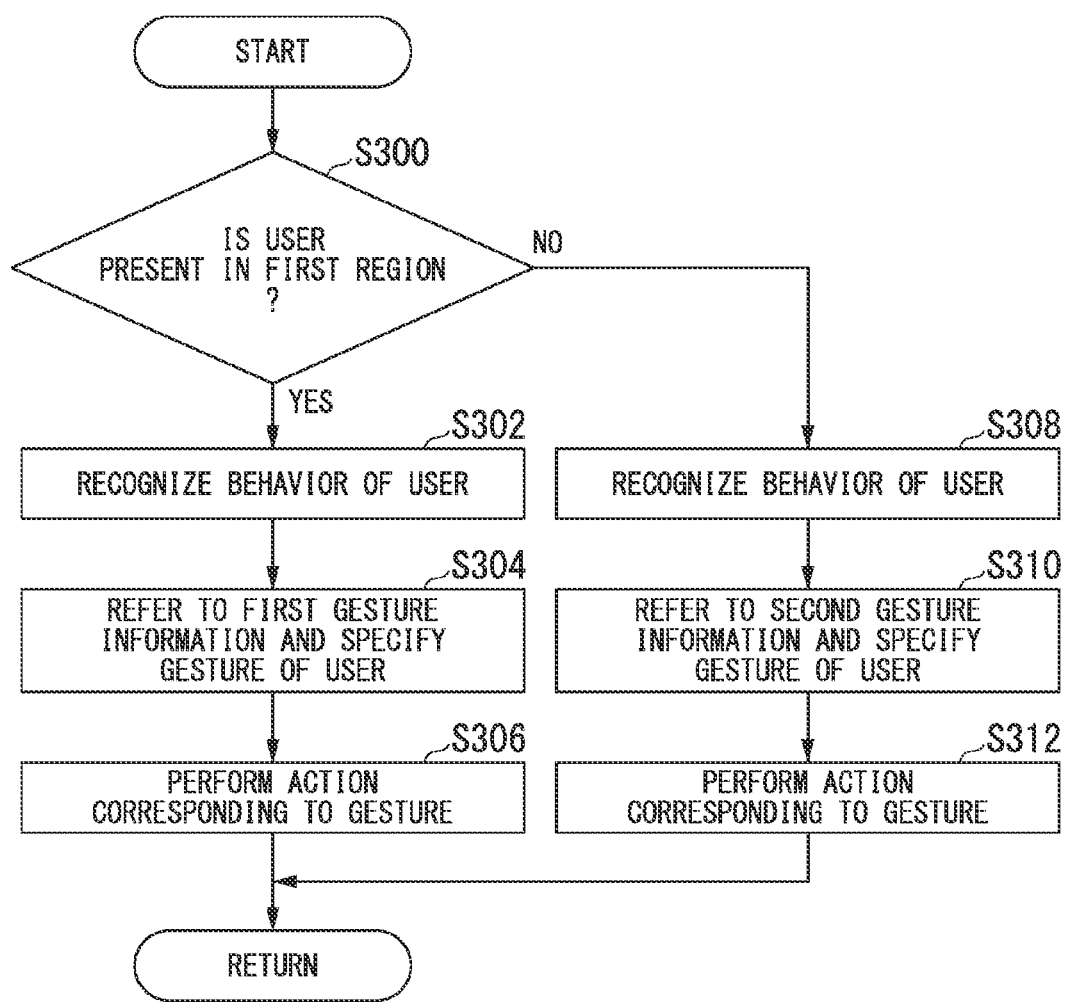
FIG. 18 is a flowchart showing an example of a processing in which the control device recognizes a gesture.

FIG. 18 is a flowchart showing an example of processing in which the control device 50 recognizes a gesture. First, the control device 50 determines whether or not the user is present in the first region (Step S300). In a case in which the user is present in the first region, the control device 50 recognizes a behavior of the user on the basis of the acquired image (Step S302). The behavior is a user's motion recognized from images temporally successively acquired, for example.

Next, the control device 50 refers to the first gesture information 76 and specifies a gesture that conforms to the behavior recognized in Step S302 (Step S304). In a case in which the gesture that conforms to the behavior recognized in Step S302 is not included in the first gesture information 76, it is determined that the gesture for controlling the motion of the mobile object 10 has not been performed. Next, the control device 50 performs an action corresponding to the specified gesture (Step S306).

In a case in which the user is not present in the first region (in a case in which the user is present in the second region), the control device 50 recognizes a user's behavior on the basis of the acquired images (Step S308), refers to the second gesture information 78, and specifies a gesture that conforms to the behavior recognized in Step S308 (Step S310). Next, the control device 50 performs an action corresponding to the specified gesture (Step S312). In this manner, processing of one routine in the flowchart ends.

For example, the recognizer 54 may recognize the gesture of the use who is being tracked and may not perform processing of recognizing gestures of persons who are not being tracked in the aforementioned processing. In this manner, the control device 50 can perform the control of the mobile object with a reduced processing load on the basis of the gesture of the user who is being tracked.

As described above, the control device 50 can further accurately recognize the gesture of the user and cause the mobile object 10 to operate in accordance with the user's intention by switching the gesture to be recognized on the basis of the region where the user is present. As a result, user's convenience is improved.

According to the first embodiment described above, it is possible to accurately specify a target while reducing a processing load by the control device 50 converting a first image into a second image with lower resolution than that of the first image, acquiring a target region including an objective target to be tracked in the second image, and acquiring a target region including the objective target in the first image on the basis of the acquired target region in the second image.

The embodiment described above can be expressed as follows.

A processing apparatus including:

a storage device configured to store instructions; and one or more processors, in which the one or more processors execute the instructions stored in the storage device to convert a first image into a second image with lower resolution than a resolution of the first image, and specify a target region including a predetermined objective target in the second image on the basis of the second image and specify a target region including the objective target in the first image on the basis of the specified target region in the second image.

Although the forms to implement the present invention have been described using the embodiments hitherto, the present invention is not limited to such embodiments at all, and various modifications and replacements can be made without departing from the gist of the invention.

What is claimed is:

1. A processing apparatus comprising:

a storage device configured to store instructions; and one or more processors, wherein the one or more processors execute the instructions stored in the storage device to:

convert a first image into a second image with a lower resolution than a resolution of the first image, and specify a target region including a predetermined objective target in the second image on the basis of the second image and specify a target region including the objective target in the first image on the basis of the specified target region in the second image, wherein the one or more processors execute the instructions to specify the target region including the objective target in the first image before conversion into the second image on the basis of the target region in the second image and execute predetermined image recognition processing on the specified target region in the first image wherein the predetermined image recognition processing includes processing for recognizing a gesture of the objective target on the basis of information regarding a specific region in the target region in the first image, and wherein the predetermined image recognition processing includes the processing of recognizing the gesture using, with priority, the information regarding the specific region with a high degree of chronological change in motions of the objective target in two or more specific regions in the target region in the first image.

2. The processing apparatus according to claim 1, wherein the one or more processors execute the instructions to analyze the second image obtained by converting the first image captured at a first clock time and the second image obtained by converting the first image captured at a second clock time later than the first clock time and track, in the second image corresponding to the second clock time, an objective target included in the target region in the second image corresponding to the first clock time.

3. The processing apparatus according to claim 1, wherein the one or more processors execute the instructions to track the objective target in the second image on the basis of a change in position of the objective target in second images in a time series manner obtained by converting first images captured in a time series manner.

4. The processing apparatus according to claim 1, wherein the objective target is a person, and the one or more processors execute the instructions to track the person in the second image on the basis of one or more pieces of information out of a color of clothes of the person, a gender of the person, and a hairstyle of the person obtained from the second image, which is obtained by converting the first image captured in the past, or stored in a storage.

5. The processing apparatus according to claim 1, wherein the predetermined image recognition processing includes specifying the specific region on the basis of recognition of a skeleton or joint points in the target region in the first image.

6. The processing apparatus according to claim 5, wherein the predetermined image recognition processing includes processing of regarding a region including arms or hands of the objective target as the specific region on the basis of a result of recognizing the skeleton or the joint points.

7. The processing apparatus according to claim 1, wherein the two or more specific regions include at least a specific region specified as a region including a right arm or a right hand of the objective target and a specific region specified as a region including a left arm or a left hand of the objective target.

8. The processing apparatus according to claim 1,
wherein the objective target is a person, and
the one or more processors execute the instructions to extract a region including a face of the person in the first image, match feature amounts of the face included in the extracted region with feature amounts of the face of the person stored in a storage in advance, and track the person as the objective target.

9. The processing apparatus according to claim 1, wherein the objective target is a person, and
the one or more processors execute the instructions to track, in the second image obtained by converting the first image captured at a second clock time later than a first clock time, the person included in the target region of the second image obtained by converting the first image captured at the first clock time, and extract a region including arms or hands of the person tracked in the first image captured at the second clock time on the basis of a result of the tracking and recognize a gesture of the person on the basis of the extracted region.

10. A processing apparatus according to claim 1, wherein the one or more processors execute the instructions to control a mobile object on the basis of the gesture.

11. A mobile object comprising:
the processing apparatus according to claim 1 mounted therein.

12. A processing method comprising, by a computer:
converting a first image into a second image with a lower resolution than a resolution of the first image; and
specifying a target region including a predetermined objective target in the second image on the basis of the second image and specifying a target region including the objective target in the first image on the basis of the specified target region in the second image,
wherein the specifying the target region comprises specifying the target region including the objective target in the first image before conversion into the second image on the basis of the target region in the second image and execute predetermined image recognition processing on the specified target region in the first image
wherein the predetermined image recognition processing includes processing for recognizing a gesture of the objective target on the basis of information regarding a specific region in the target region in the first image, and
wherein the predetermined image recognition processing includes the processing of recognizing the gesture using, with priority, the information regarding the specific region with a high degree of chronological change in motions of the objective target in two or more specific regions in the target region in the first image.

13. A non-transitory computer storage medium storing instructions causing a computer to execute:
converting a first image into a second image with a lower resolution than a resolution of the first image; and
specifying a target region including a predetermined objective target in the second image on the basis of the second image and specifying a target region including the objective target in the first image on the basis of the specified target region in the second image,
wherein the specifying the target region comprises specifying the target region including the objective target in the first image before conversion into the second image on the basis of the target region in the second image and execute predetermined image recognition processing on the specified target region in the first image
wherein the predetermined image recognition processing includes processing for recognizing a gesture of the objective target on the basis of information regarding a specific region in the target region in the first image, and
wherein the predetermined image recognition processing includes the processing of recognizing the gesture using, with priority, the information regarding the specific region with a high degree of chronological change in motions of the objective target in two or more specific regions in the target region in the first image.

* * * * *